(12) United States Patent
Dierickx (10) Patent No.: US 11,330,207 B1
(45) Date of Patent: May 10, 2022

(54) HIGH DYNAMIC RANGE IN DIRECT INJECTION

(71) Applicant: Caeleste CVBA, Mechelen (BE)

(72) Inventor: Bart Dierickx, Edegem (BE)

(73) Assignee: CAELESTE CVBA, Mechelen (BE)

( * ) Notice: Subject to any disclaimer, the term of this patent is extended or adjusted under 35 U.S.C. 154(b) by 0 days.

(21) Appl. No.: 17/186,277

(22) Filed: Feb. 26, 2021

(51) Int. Cl.
*H04N 5/355* (2011.01)
*H04N 5/359* (2011.01)
*H04N 5/378* (2011.01)

(52) U.S. Cl.
CPC ......... *H04N 5/3559* (2013.01); *H04N 5/3594* (2013.01); *H04N 5/378* (2013.01)

(58) Field of Classification Search
CPC ....... H04N 5/355; H04N 5/3594; H04N 5/378
See application file for complete search history.

(56) References Cited

U.S. PATENT DOCUMENTS

| | | | |
|---|---|---|---|
| 2004/0041077 A1* | 3/2004 | Fossum | H01L 27/14609 250/208.1 |
| 2011/0211103 A1* | 9/2011 | Sakano | H04N 5/37452 348/308 |
| 2014/0263947 A1 | 9/2014 | Dierickx | |

* cited by examiner

*Primary Examiner* — Nicholas G Giles
(74) *Attorney, Agent, or Firm* — Workman Nydegger (57) ABSTRACT

A pixel structure and a method of reading charges generated by a radiation sensing element upon exposure thereof to radiation is presented. The pixel structure comprises at least two capacitors configured for integrating charge from a radiation sensing element, where an overflow transistor sets a predetermined threshold level by a static voltage on its control electrode. This allows charges generated in the radiation sensing element to be integrated in either the first capacitor for a level of charge generated by the radiation sensing element, while the level remains under a predetermined threshold level, or in the at least one further capacitor for a level of charge generated by the radiation sensing element when said level surpasses said predetermined threshold level. At least one merge switch is used for merging the charges of the first capacitor with the charges of the at least one further capacitor.

14 Claims, 8 Drawing Sheets

HIGH DYNAMIC RANGE IN DIRECT INJECTION

FIELD OF THE INVENTION

The invention relates to the field of signal processing and readout. More specifically it relates to a pixel with direct injection configuration for image sensing.

BACKGROUND OF THE INVENTION

Charges generated in radiation sensitive elements, for example in radiation photosensors, need to be processed to a readable signal in order to provide a meaningful output, but depending on illumination conditions the charges may saturate the sensor. Sensors may be optimized for low level signals (low intensity illumination) or high level signals (high intensity illumination). Providing a pixel with high dynamic range is costly and complex, and it has numerous limitations.

A high dynamic range (HDR) image sensor can be provided, which is able to integrate photocharges, provide a readout signal and then post-process two or more normal dynamic range signals. However, such sensors are limited to pinned photodiodes and require transfer gates and careful control thereof.

Other configurations, such as direct injection configurations, show image lag at low current levels generated by low intensity radiation.

It would be desirable to provide a radiation sensor or pixel circuit with high dynamic range for different illumination conditions, in a simple and reliable configuration and without these technical limitations.

SUMMARY OF THE INVENTION

It is an object of embodiments of the present invention to provide a radiation sensor circuit for providing high dynamic range reading, for different illumination conditions, e.g. including high intensity illumination, with a simple circuit comprising simple switches and potential gates.

In a first aspect, the present invention provides a pixel structure for reading charges generated by a radiation sensing element upon exposure thereof to radiation. The pixel structure comprises:

a first capacitor configured for integrating charge from the radiation sensing element at least one further capacitor also configured for integrating charge from the radiation sensing element, a first overflow transistor having two main electrodes and a control electrode, the overflow transistor having its control electrode connected to a static voltage, for setting a predetermined threshold level.

This first overflow transistor, thanks to the static voltage, allows charges generated in the radiation sensing element to be integrated in the first capacitor for a level of charge generated by the radiation sensing element wherein said level remains under a predetermined threshold level, or in the at least one further capacitor for a level of charge generated by the radiation sensing element wherein said level surpasses said predetermined threshold level.

The structure further includes at least one merge switch for merging the charges of the first capacitor with the charges of the at least one further capacitor.

It is an advantage of embodiments of the present invention that high light conditions do not saturate the output signal as generated charges can be temporarily integrated in different capacitors. It is an advantage of embodiments of the present invention that a high dynamic range pixel can be obtained in a simple way. It is an advantage that it can be applied to a wide range of sensing elements. The configuration can be used in monolithic image sensors, not requiring the use of PPDs and/or TGs. It can also be used in hybrid sensors where the detector array can be connected to the readout stage, or in semi-hybrid sensors (by deposition of sensing material on a readout chip). It is an advantage that the readout stage may be a ROIC (Read Out Integrated Circuit). It is a further advantage that multi-level biasing is not needed; it is possible to only use a DC bias and a simple on/off switch. It is an advantage that transistors such as MOSFETs can be used. They can be manufactured with well-known processing techniques.

In some embodiments of the present invention, at least one merge switch is configured to shunt the first capacitor and a further capacitor. This allows providing a readout based on charges integrated in the first capacitor and the further capacitor.

It is an advantage of embodiments of the present invention that the overflow transistor can be easily biased with a voltage signal that does not need to be very accurate.

In some embodiments of the present invention, the structure includes a signal output node for providing a readout signal based on integrated charges and a buffer amplifier connected to the signal output node. It is an advantage of embodiments of the present invention that the readout stage can be implemented in a ROIC.

In some embodiments of the present invention, the pixel structure includes a further overflow transistor connected between the first overflow transistor and a connection to a radiation sensitive element. It is an advantage that the additional overflow transistor provides accuracy and stability of the bias over the sensing element.

In some embodiments of the present invention, this further overflow transistor comprises a control electrode arranged for being connected to the same static voltage as the first overflow transistor. It is an advantage that, by connecting both overflow transistors to the same DC voltage, the implementation can be made very compact. Bias stability is improved and the number of sources is reduced.

In some embodiments of the present invention, a feedback loop is included for biasing at least one overflow transistor, optionally all overflow transistors.

It is an advantage of embodiments of the present invention that the bias accuracy is improved and image lag is reduced. Additionally, the pixel structure can provide a readout at different gain levels, e.g. a high gain and a low gain, the present invention not being limited thereto, and also one or more intermediate gain levels potentially being available for readout.

In some embodiments of the present invention, the capacitance of each further capacitor is at least larger, e.g. at least twice, or at least four times, or at least ten times larger than the capacitance of the previous capacitor.

In some embodiments of the present invention, the at least one further capacitor comprises a plurality of further capacitors each configured for receiving charges from the radiation sensing element via an associated overflow transistor. These are configured to allow charges generated in the radiation sensing element to be integrated in the associated further capacitors depending on the level of charge already being stored in the previous capacitor. This means that each further capacitor is associated to an overflow transistor, through which charges are received when the voltage of the node overcomes the barrier of the transistor. Each associated overflow transistor may be optionally biased with the same voltage.

It is an advantage of embodiments of the present invention that the pixel structure can provide a readout at more than two gain levels.

In some embodiments of the present invention, the pixel structure further comprises at least one reset transistor for resetting charges integrated in at least one of the first capacitor and at least one further capacitor.

It is an advantage of embodiments of the present invention that the pixel structure can be reset and start a new readout at specified times.

In a further aspect, the present invention provides a method of reading charges generated by a radiation sensing element, by providing photogenerated charges by exposing the radiation sensing element to radiation, subsequently:

integrating the photogenerated charges in a first capacitor for a charge level under a first predetermined charge, and further integrating any further photogenerated charge in at least one further capacitor by overflowing charges over a first overflow transistor having its control electrode connected to a static DC voltage bias, obtaining a high gain signal level representative of the charges integrated in the first capacitor while a first merge switch is switched off, and subsequently switching the merge switch on. This allows obtaining a low gain signal level representative of the charges integrated in the first capacitor and in the at least further capacitor.

It is an advantage of embodiments of the present invention that a wide range of pixels can provide high dynamic range functionality.

In some embodiments of the present invention, the method comprises stabilizing the bias voltage over the radiation sensing element by a further overflow transistor connected to the radiation sensing element and biased with a constant voltage.

It is an advantage of embodiments of the present invention that the stability of the sensing element bias can be improved.

In some embodiments of the present invention, the first overflow transistor and the further overflow transistor, and/or any other further overflow transistor, are biased with a same constant voltage. Bias is improved and the method can be done in a simple structure.

In some embodiments of the present invention, integrating the photogenerated charges comprises integrating the photogenerated charges in a first capacitor until the voltage of the node connected to the first capacitor surpasses the voltage barrier set by the overflow transistor, e.g. for a charge level under a first predetermined charge level. The method subsequently comprises integrating further photogenerated charges in a plurality of further capacitors. Each of these further capacitors are connected to the previous capacitor by respective overflow transistor. It is an advantage of embodiments of the present invention that all photocharges from the sensing element can be read out and readout of multiple gain levels can be obtained. For example, in some embodiments of the present invention, a medium gain signal level representative of the charges integrated in the first capacitor and in less than each of the further capacitors can be obtained, subsequently obtaining a low gain signal level by obtaining a signal level representative of the charges integrated in the first capacitor and in each of the further capacitors.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "switching means" reference is made to a switchable element which can be controlled to either allow the transmission of a signal or to stop it, for example an on/off switch which can be linked or is linked to a unit configured to turn the switch on or off. For example, the switching means may comprise a transistor element or the like, which can be switched from a conductive to a non-conductive state, e.g. by using a bias voltage unit configured for providing a switching voltage.

Where in embodiments of the present invention reference is made to pixel structure, reference is made to an electrical circuit which turns a charge generated in a photosensitive element into a readable signal, such as an electrical signal, e.g. a voltage. Photosensitive elements, or radiation sensing elements, are sensitive to radiation of any kind, for example radiation with a wavelength between IR and UV, e.g. visible radiation, the present invention not being limited thereto. For example the pixel structure can be used with charges generated by high energy radiation, X-rays or gamma radiation, even corpuscular radiation.

Some pixel structures include a charge storage device or a circuit which collects charge from the radiation sensing element before readout. A pixel comprises a pixel structure and a radiation sensing element. The pixel may also comprise connections to data lines, to power supplies, etc.

The present invention provides a pixel structure with a charge storage device for cascaded collection of charges, and a method of driving the pixel structure. Charges are accumulated under a predetermined threshold value in a charge node. For a charge level which surpasses that threshold value, further charges are collected in a different charge node. These charge nodes usually comprise capacitors. In embodiments of the present invention, the term 'capacitor' will be used to refer to a node suitable for integrating and store charge. The threshold is provided by an overflow gate or overflow transistor as it will be referred to in the description and claims, in other words a potential barrier over which charges overflow when the potential generated by the accumulated charges surpasses the barrier. Several barriers and respective capacitors can be used for obtaining a wider accumulation range. In embodiments, the barrier is provided by a gate (e.g. transistor gate) polarized by a constant signal.

For readout, the charge nodes can be selectively connected to the output of the pixel structure, which may include a readout stage, e.g. a source follower (SF).

In a first aspect, the present invention relates to a pixel structure for reading charges from a detector or, in general, a radiation sensing element, and for providing a readout signal based on the charges generated in the radiation sensing element as a response of impinging radiation. The charges are accumulated or integrated in a charge storage circuit from the radiation sensing element, from which they are read out. The charge storage circuit includes a plurality of storage nodes (or capacitors) separated from each other by overflow transistors so that charges from the sensing element are collected in a first node until the charge level surpasses the first barrier, then in a further node until the charge level surpasses an optional second barrier, etc.

In some embodiments of the present invention, each further node has a higher charge capacitance than the previous node. Hence, the node or capacitor with the lowest capacitance is the one that receives charge from the sensing element first. In other words, the capacitor with the least number of barriers between itself and the sensing element is the first capacitor, which has the lowest capacitance, any subsequent capacitor is selected to have an increasing capacitance value.

In embodiments of the present invention, the barrier may include or consist of an overflow transistor with a control electrode connectable to a suitable biasing. The overflow transistor may have a simple implementation. The overflow transistor may comprise a MOSFET structure which is easy to implement and control. The present invention is not limited thereto, and it may be a JFET, an implanted potential barrier such as the barrier shown in application US2014263947, etc. Across the description of embodiments of the present invention, the term 'overflow transistor' will be used to refer to such element which can generate an overflow potential by application of a signal thereon. In embodiments of the present invention the signal may be a DC signal, for example a constant or static signal. The DC signal may be a constant voltage.

The pixel structure is adapted to provide different readouts at different gains, by allowing reading of the charge in storage nodes separately. In particular, the pixel structure is adapted to provide readout of charges not surpassing the threshold of the first barrier, e.g. readout of charges in the first capacitor, and readout of merged charges in further capacitors. The readout of charges in the first capacitor is called 'high gain readout' of charges, and at least one 'low gain readout' of merged charges can be done after the high gain readout. Readout of merged charges is provided by switching means included in the pixel structure, for selectably electrically coupling at least two of the capacitors for merging their stored charges. Switching means may advantageously be simple, for example a transistor.

Figure 1:
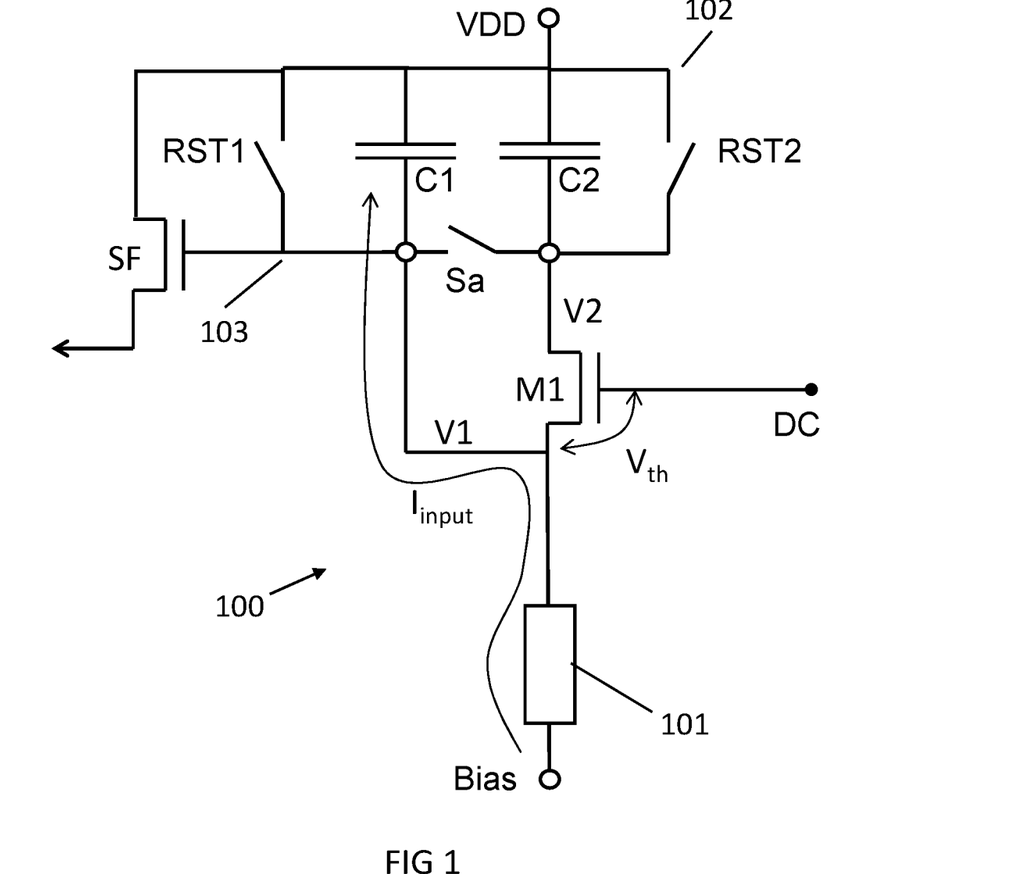
FIG. 1 illustrates a schematic representation of a pixel structure in accordance with embodiments of the present invention, comprising an overflow gate and two capacitors whose charges can be merged by a switch for reading out collected charges.

FIG. 1 shows an embodiment of a pixel structure 100 in accordance with the present invention, connected to a radiation sensing element 101. The pixel structure includes a charge storage circuit 102 and a signal output node 103 connected to the charge storage circuit, for providing a signal based on the amount of charge stored therein (thus, 'reading' the charge). The charge storage circuit is configured for receiving charges from the radiation sensing element 101. The sensing element 101 may be a biased device, a photoelectric device which generates charges upon being impinged with radiation, e.g. a photodiode, photoresistor, etc.

The charge storage circuit 102 of the embodiment of FIG. 1 can receive and accumulate charges from the radiation sensing element 101 in at least two capacitors C1, C2. However, the present invention is not limited to two capacitors, as explained below. In some embodiments of the present invention, the capacitance of the first capacitor C1 is smaller than the capacitance of the second capacitor C2. For example the capacitance of a capacitor may be twice, or four times, or even ten times smaller than the capacitance of a subsequent capacitor. In other words, the capacitance of each subsequent capacitor may be twice, four times or even ten times larger than the capacitance of the previous capacitor.

The charge storage circuit 102 further includes an overflow transistor M1 (also called overflow barrier) configured to redirect charges to a predetermined capacitor C1, allowing charge integration therein, or to at least the further capacitor C2, depending on the charge level at the input. The radiation sensing element 101 may generate charges upon radiation impingement, which charges are transferred to the charge storage circuit 102. If the level of transferred charges remains below a predetermined level, the first capacitor C1 receives the charge from the input. When the level of transferred charges surpasses this predetermined level, for example due to high radiation intensity, then the charges accumulated in the capacitor C1 generate a voltage V1 which surpasses the potential barrier $V_{th}$ generated by the overflow transistor M1, causing charges to overflow the gate M1. A further capacitor C2 receives the overflown charge from the input. Thus, charges photogenerated by high intensity radiation can be portioned and read out without overexposure of the pixel.

The overflow transistor M1 may generate the potential by connection to a DC power supply as mentioned earlier. The potential of the overflow transistor M1 is provided by the difference between the direct voltage of the DC power source and the threshold voltage $V_{th}$ of the gate M1.

Charge levels generating a voltage under the potential barrier of the gate M1 can be accumulated in a first capacitor C1 and readout through the output node 103, for the high gain readout. For the low gain readout, switching means may include a merge switch Sa for electrically connecting the further capacitor C2, which stores overflown charges, to the same output node 103 of the pixel structure. Thus, different gain signals can be read through a single output node 103. Switching the merge switch on (thus closing the switch) electrically couples the capacitor to the output node 103. The switch Sa may be a simple ON/OFF switch, for example a transistor with a gate connectable to control means, such as a power source which can provide either high or low bias for pixel readout.

It is an advantage that the implementation of both the overflow transistor M1 and the merge switch Sa may use simple devices, so multi-level gates and accurate sources and control thereof for biasing the gates are not necessary in the pixel structure of the present invention.

Readout is performed by reading the charges in the output node 103. In the embodiment of FIG. 1, the output node 103 is the input of a source follower stage SF. The presence of a source follower stage SF is optional, in general any suitable buffer amplifier or other output stages can be used (the output stage is not shown in the rest of figures). However, the implementation of SF advantageously is simple.

The radiation sensing element 101 can be electrically coupled to the SF stage. At the moment of readout, the voltage V1 at the output node 103 is read through the SF. This voltage V1 is proportional to the charge received by the first capacitor C1 (q=C V, q being the charge), and the readout corresponds to the "high gain signal". Charges generated by the sensing element 101 generate a voltage V1 at the output node; when the voltage surpasses the barrier of the overflow transistor M1, extra charges surpass said overflow transistor M1 and are accumulated in the capacitor C2. The voltage V2 in that node is proportional to the charge received by the further capacitor C2.

Then the merge switch Sa is pulsed or set high, the two nodes carrying the voltages V1, V2 are shunted, merging the charges in C1 and C2 onto the output node 103. These merged charges are read out subsequently as the "low gain signal" through the source follower stage SF. Readout then proceeds as usual, including resetting of the charge storage device and new exposure of the radiation sensing element 101 to radiation for charge generation therein.

Figure 2:
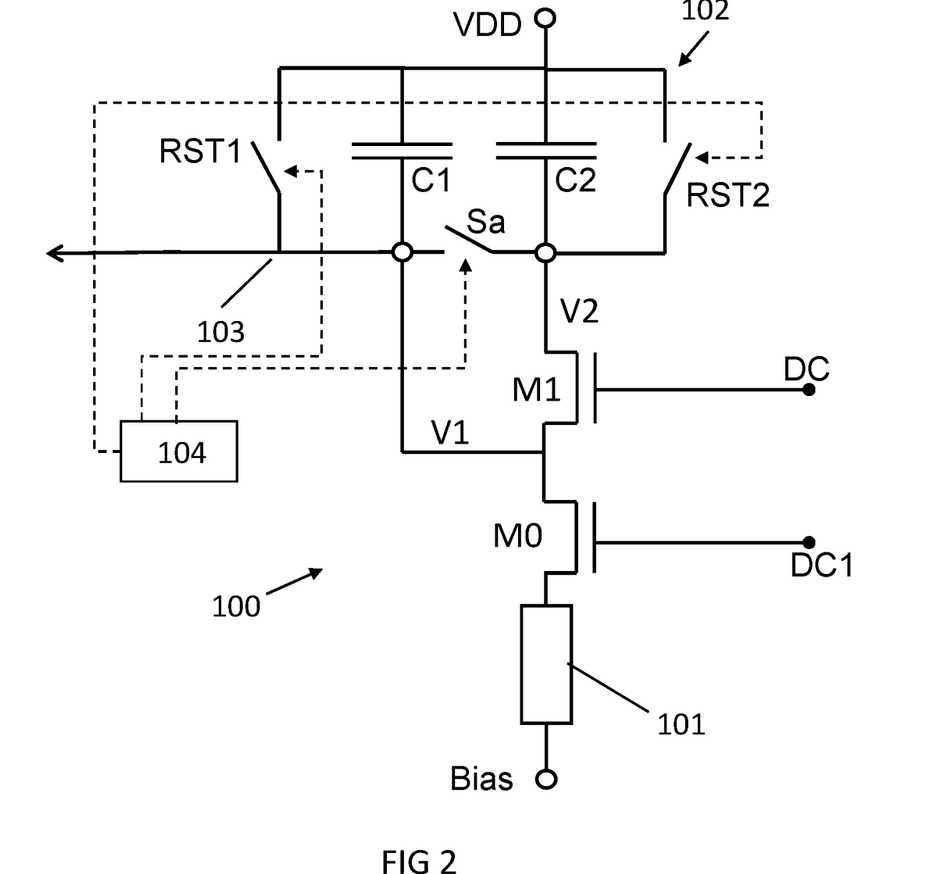
FIG. 2 illustrates an alternative schematic representation of a pixel structure in accordance with embodiments of the present invention, comprising an overflow gate M0 for improving stability of the bias voltage over the sensing element, another overflow gate and two capacitors whose charges can be merged by a switch.

FIG. 2 shows a further overflow transistor M0 between the sensing element 101 and the output node 103. The further overflow transistor M0 can be a MOSFET structure although other suitable electronic elements which can generate a potential barrier can be used. The further overflow transistor M0 may allow transfer of charges generated and accumulated in the sensing element 101 to the charge storage circuit 102. This stabilizes the bias voltage over the sensing element 101. The second capacitor C2 of the charge storage circuit 102 is electrically connected to the sensing element 101 through the overflow transistor M0 and the overflow transistor M1. In other words, two barriers must be overcome by charges before being integrated in the second capacitor C2. The node between the two overflow transistors M0, M1 is connected (or coupled, e.g. hardwired) to the first capacitor C1. Charge transferred to that node is stored in the first capacitor C1, causing the change of the voltage V1. When the charge surpasses a threshold value, surpassing the barrier set by the overflow transistor M1, charge starts accumulating in the further capacitor C2, which changes the voltage V2 on the node between the overflow transistor M1 and the further capacitor C2.

In some embodiments of the present invention, the potential barrier set by the further overflow transistor M0 depends on its characteristics (e.g. on its transistor threshold voltage $V_{th}$) and the (constant) signal DC1 applied to its gate. In the embodiment shown in FIG. 2, the overflow transistor M1 of the further capacitor C2 also comprises a transistor element (e.g. a MOSFET) with a threshold voltage and a signal DC applied to its gate, and the signal DC which sets the overflow transistor M1 of the further capacitor C2 is different from the signal DC1 applied to the further overflow transistor M0.

The charge storage circuit 102 is electrically connected to the output 103. In particular, the first capacitor C1 is connected directly (via a resistive line, e.g. hardwired) to the output 103, whereas each of the at least one further capacitor C2 can be connected via switching means to the output node 103. In the embodiment of FIG. 2, the further capacitor C2 is electrically connectable to the output 103 via one merge switch Sa. This allows independent readings of charges depending whether they were accumulated under or over a threshold, using a simple on/off logic signal.

The charge storage circuit 102 may include a source or a connection to a source, for example a connection to a supply voltage VDD, for biasing the capacitors. The charge storage circuit 102 may include also reset means for resetting the capacitors. For example, a reset switch RST1 may be used to connect the nodes of the capacitor C1 and reset its voltage V1 to the supply voltage VDD. The nodes of the second capacitor can be reset via an independent reset switch RST2 in the same way, thus resetting the voltage V2. However, the present invention is not limited to a reset switch per capacitor. Each integration capacitor can be connected to the supply voltage VDD via one or more switches in series or parallel. For example, each capacitor may be coupled to a supply voltage via a respective reset switch. For example, a first node can be reset by closing a reset switch, while a further node can be reset by closing that reset switch and the switching means. The source and the first and second nodes are connected to the supply voltage, via the reset switch and via the reset switch and the switching means respectively. In this way, only one reset switch may be required, and the capacitors can be reset by connecting the reset switch and corresponding merge switches.

Figure 3:
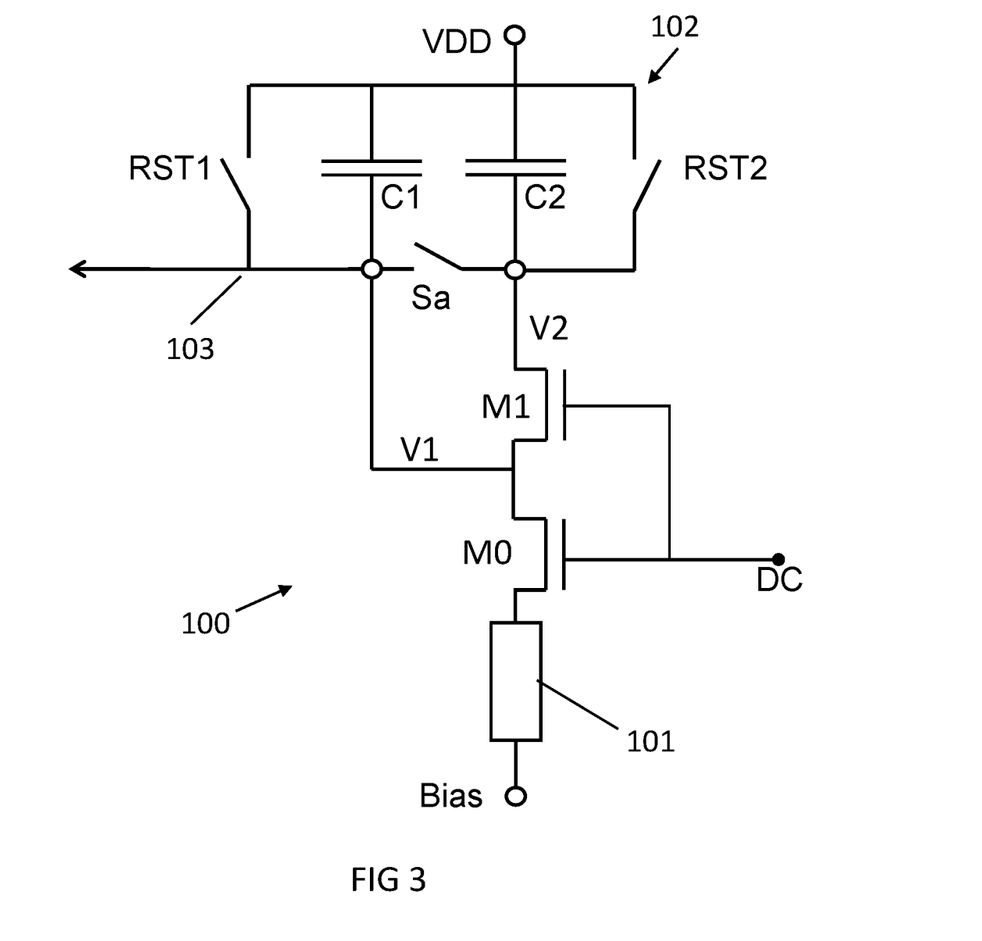
FIG. 3 illustrates an alternative schematic representation of a pixel structure in accordance with embodiments of the present invention where the overflow gates are biased by a signal from a single input.

FIG. 2 and FIG. 3 show very similar pixel structures; however, the overflow transistor M1 is hardwired to be biased with the same gate voltage as the further overflow transistor M0.

The charge storage circuit in embodiments of the present invention may include more than two capacitors. The first capacitor C1 receives charges from the sensing element 101 through an optional further overflow transistor M0 while the potential V1 of the node to which the first capacitor C1 is connected does not surpass the threshold value set by the overflow transistor M1 of the second capacitor C2, while the second capacitor C2 receives charges which surpasses the threshold value set by that overflow transistor M1. A further barrier formed by a further overflow transistor M2 may be present between the node of the second capacitor with a further capacitor C3, which receives charges in case the charges overflow said further barrier. A series of further barriers connected to capacitors may be laid out in the charge storage circuit, so each further capacitor receives charges overflowing each of the barriers connecting that further capacitor to the sensing element 101. Each subsequent capacitor may have a larger capacitance than the previous one.

Figure 4:
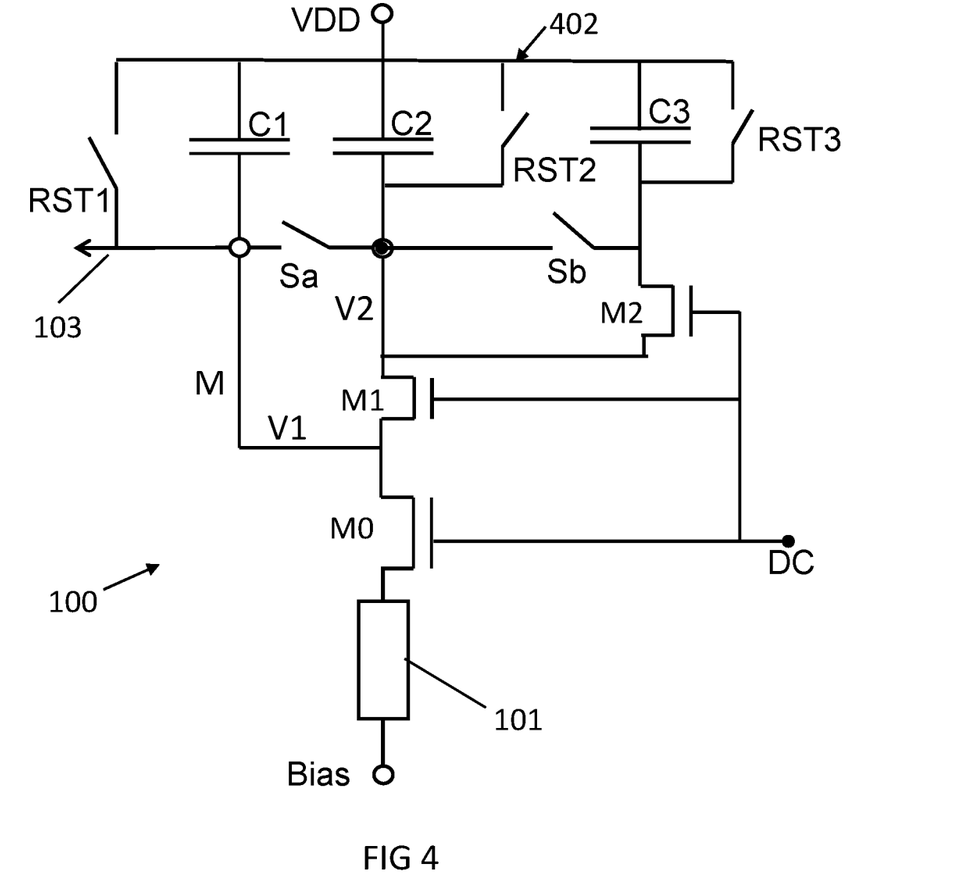
FIG. 4 and FIG. 5 illustrate two alternative schematic representations of a pixel structure in accordance with embodiments of the present invention, comprising multiple overflow gates and capacitors whose charges can be merged by a multiple switches for reading out collected charges.
Figure 5:
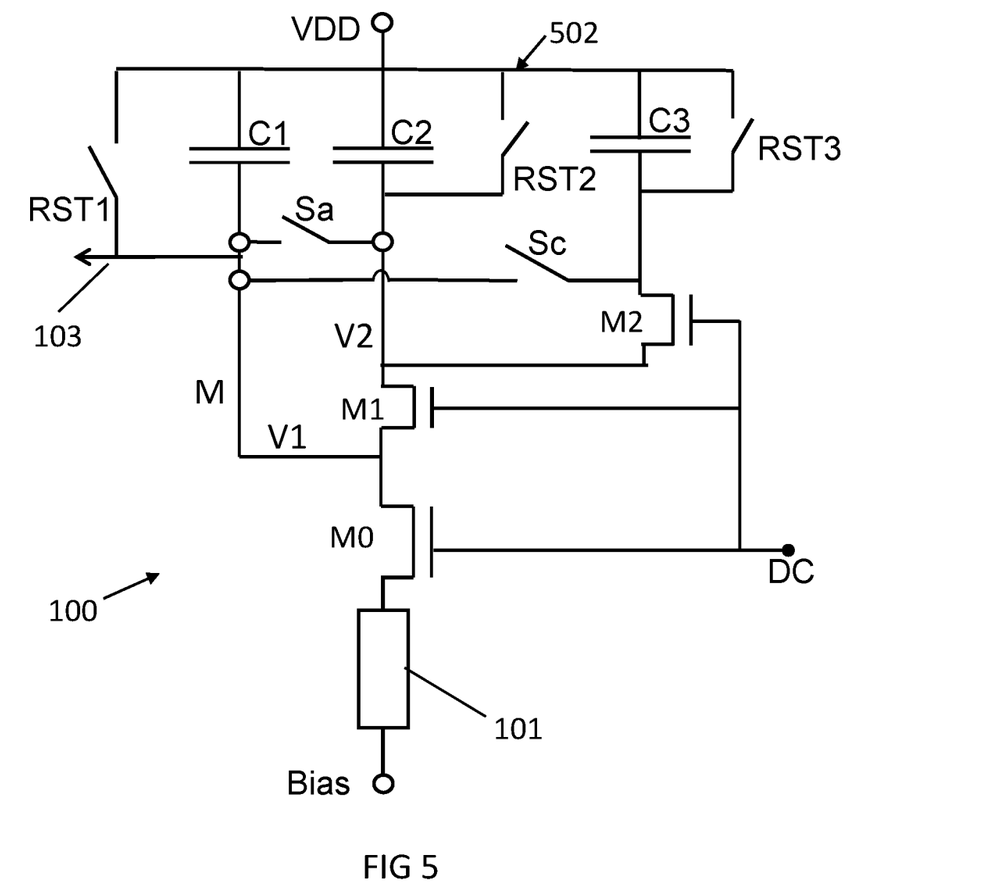

FIG. 4 and FIG. 5 show two alternative embodiments of a pixel structure where the charge storage circuit 402, 502 includes three capacitors C1, C2, C3 with two barriers M1, M2 between the output node 103 and the respective two further capacitors C2, C3. A further optional barrier generated by the overflow transistor M0 is also shown in both cases. The gates M0, M1, M2 are biased with a DC signal which, in the examples shown in FIG. 4 and FIG. 5, is the same for both overflow transistors M1, M2. For example, the connections to the gates of the transistors M1, M2 may be hardwired to the same signal input node. The potential of the barrier (or threshold value of the barrier) is determined by the applied DC signal and the threshold voltage $V_{th}$ of each transistor. The first capacitor C1, connected to the sensing element 101 via an overflow transistor M0, shows the lowest capacitance. Each further capacitor C2, C3 is connected to the sensing element 101 via an increasing number of barriers, so there is one gate M0 between the sensing element 101 and the first capacitor C1, there are two gates M0, M1 between the sensing element 101 and the second capacitor C2, and so on. In embodiments of the present invention, each further capacitor shows an increasingly higher capacitance (so the last capacitor C3 shows the largest capacitance; C1<C2<C3). Switching means are present to provide different gain readouts by providing readout of charges merged from different capacitors.

Thus, different gain readouts can be done by selectively switching the switching means. This switching can be controlled by signals provided by a control unit 104 programmed to perform such switching.

FIG. 4 shows the charge storage circuit 402 where the switching means comprise a first merge switch Sa connected between the first capacitor C1 and the second capacitor C2, and a second merge switch Sb connected between the second capacitor C2 and to the third capacitor C3. This allows to sequentially make a high gain readout by reading charges in C1, a medium gain readout by merging the charges in C2 and C1 via activation of switch Sa, and low gain readout by allowing further merging charges of C3, by further activation of the second merge switch Sb.

FIG. 5 shows a similar pixel as in FIG. 4. However, rather than having a first switch coupled between the first and the second capacitor, and a second switch coupled between the second and the third capacitor, in the embodiment of FIG. 5 a first switch Sa is coupled between the first capacitor C1 and the second capacitor C2, and a second switch Sc is coupled between the first capacitor C1 and the third capacitor C3. Although the connections in FIG. 4 are advantageously simple, the merging of the charges in the embodiment of FIG. 5 does not require a connection through two switches, which may result in lower loss and/or noise. The charge storage circuit 502 thus comprises an alternative configuration of the switching means, where two switches Sa, Sc respectively connect the further capacitors C2, C3 directly to the output node 103, for merging the charges of C2 with the charges in the output node 103 (for example the charges of C1 and C2 by activating the merge switch Sa), and for merging the charges of C3 with the charges in the output node 103, after merging the charges of C1 and C2, by activating the remaining merge switch Sc after activation of the first merge switch Sa. Signals on capacitors C1, C1+C2, C1+C2+C3 . . . are read out in sequence from small capacitance to progressively larger capacitance through the same output node 103 of the pixel structure.

In general, the switching means provide a selectable connection between each capacitor and the output node 103, either directly via a single switch, e.g. transistor, or via a plurality of switches, e.g. transistors, which connect capacitors to one another, so that a connection can be formed by suitably activating merge switches for merging charges in the respective capacitors. For example, in the embodiment of FIG. 4, merging the charges in the capacitor C3 with charges already present on output node 103 requires that both switches Sa, Sb are closed. On the other hand, in the embodiment of FIG. 5, merging the charges in the capacitor C3 with charges already present on output node 103 requires closing the respective switch Sc which connects the capacitor C3 directly to the output node 103, although for merging the charges of all capacitors, a closed electric connection should exist between the capacitors and the output node 103 by closing also the switch Sa.

The control unit 104, illustrated in FIG. 2, can also be applied to the embodiments illustrated in the remainder of the figures, and in particular also to FIG. 4 and FIG. 5. Depending on the implementation of the pixel structure, the instructions and connections of the control unit 104 may be adapted for two or more switches instead of one. Thus, different gain readouts can be performed by selectively and sequentially switching the switching means Sa, Sb or Sa, Sc, as laid out above.

For example the readout can be done in the embodiment of FIG. 4 by first performing the readout of the charges integrated in C1 while the merge switches Sa, Sb are both opened (high gain signal level readout). Closing the first merge switch Sa while the further merge switch Sb remains open provides merging of the charges in the capacitors C1, C2 connected by the closed switch Sa. Thus, a medium gain signal level readout can be provided. Closing both merge switches Sa, Sb provides electric contact between the capacitors C1, C2, C3 and the readout node 103, providing further merging of charges. The low gain signal level readout can be provided in this way. The control of the switches is similar in FIG. 5.

The overflow transistors M0, M1, M2 of FIG. 4 and FIG. 5 are configured to receive a DC signal from a single input, e.g. they may be hardwired to a single input of a DC signal. This advantageously provides a simple configuration. However, the present invention is not limited to this configuration. For example different DC signals may be applied to control electrodes of different overflow transistors. For example, a feedback loop may be provided at the control electrode of one or more of these overflow transistors.

Figure 6:
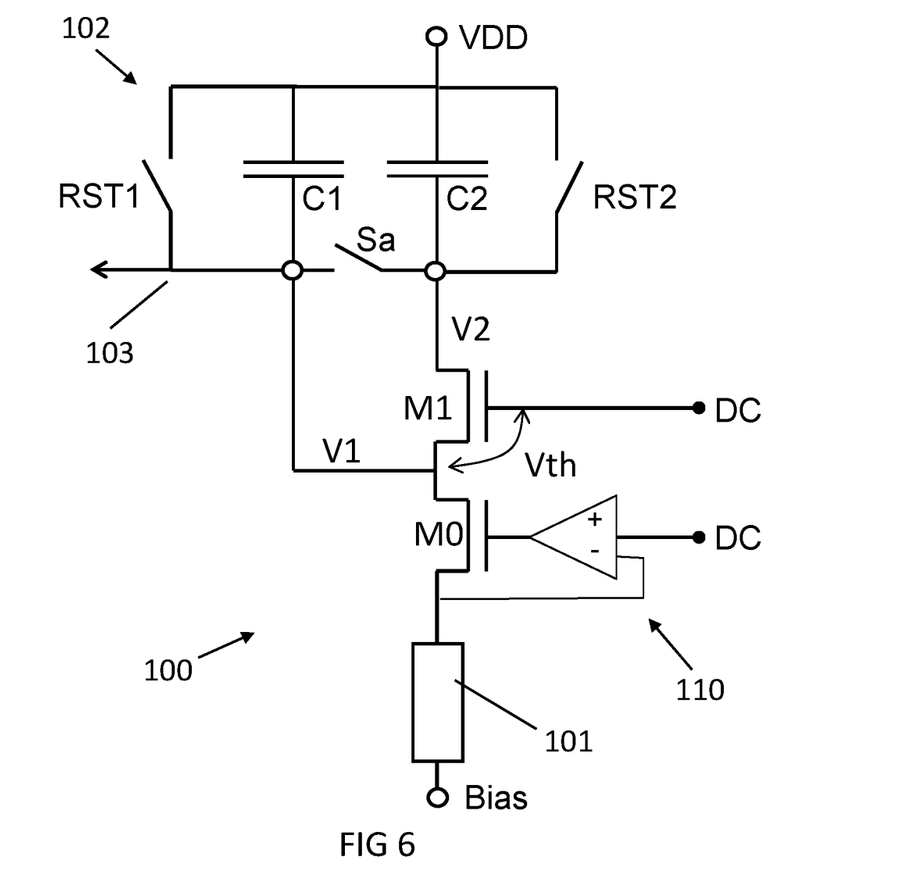
FIG. 6 and FIG. 7 illustrate two alternative schematic representations of a pixel structure in accordance with embodiments of the present invention as shown in FIG. 2 and FIG. 3, respectively, further including a feedback loop for biasing the overflow gates.
Figure 7:
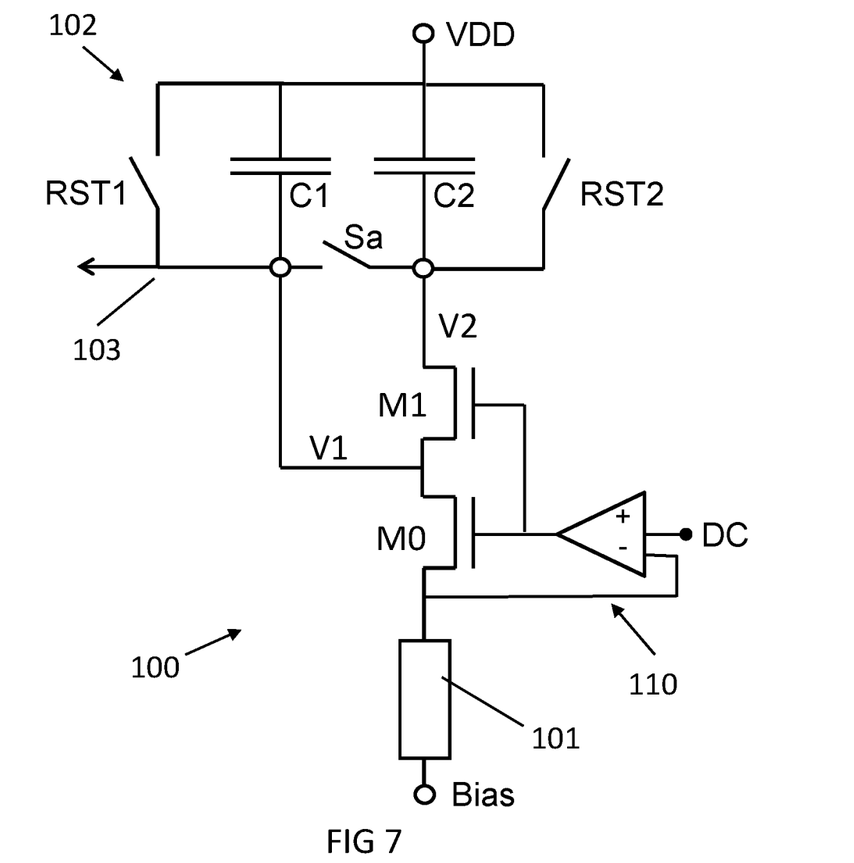

FIG. 6 and FIG. 7 show two different implementations of a feedback loop at the control electrode of the overflow transistors M0, M1. The feedback loop advantageously improves bias accuracy. It can be applied to keep the stability of the signal at the control electrode of only one overflow transistor, such as to the overflow transistor M0 connected directly to the sensing element 101, as shown in FIG. 6. It can also be applied to keep the stability of the signal introduced at the control electrode of a plurality of overflow transistors M0, M1. For example FIG. 7 shows a suitable configuration in which the signal applied at the control electrode of every overflow transistor M0, M1 is kept stable. If there were more gate-capacitor stages, the subsequent overflow transistor(s) could optionally also be configured so as to be biased by the output of the feedback loop 110. This configuration simplifies the wiring and layout while providing a stable DC signal on every gate.

The present invention allows providing high dynamic range (HDR) which can be obtained by combining the simultaneously integrated signals of two or more different "gain ranges" or "full well ranges" into a single signal.

The pixel structure may comprise a radiation sensitive element 101.

A plurality of pixel structures may be organized in an array that may be used in a sensor. They may be logically organized in the array in columns and rows. The terms "column" and "row" are used to describe sets of array elements which are linked together. The linking can be in the form of a Cartesian array of rows and columns; however, the present invention is not limited thereto. As will be understood by those skilled in the art, columns and rows can be easily interchanged and it is intended in this disclosure that these terms be interchangeable. Also, non-Cartesian arrays may be constructed and are included within the scope of the invention. Accordingly the terms "row" and "column" should be interpreted widely. To facilitate in this wide interpretation, there may be referred to "logically organised rows and columns". By this is meant that sets of elements are linked together in a topologically linear intersecting manner; however, that the physical or topographical arrangement need not be so. For example, the rows may be circles and the columns radii of these circles and the circles and radii are described in this invention as "logically organised" rows and columns. A plurality of pixel structures, e.g. in a column, may be connected to a data line for readout.

The present invention can be applied to pixel structures with a wide range of sensing elements and implementations. It does not require pinned photodiodes PPD or transfer gates TG, for example. The invention can be applied to, for example, monolithic image sensors, and to hybrid sensor where the detector array is bump-bonded or otherwise connected to the semiconductor circuit, and to semi hybrid image sensors, where the sensing material may be deposited on the semiconductor circuit comprising a readout integrated circuit ROIC. The detector arrays may comprise photovoltaic or photoresistive detectors.

In a further aspect of the present invention, a method of reading charges is provided. The method comprises transferring photogenerated charges from a sensing element to pixel structure as disclosed with reference to embodiments of the first aspect of the present invention. More in detail, the method comprises transferring these photogenerated charges to a first capacitor C1 as long as a threshold value is not surpassed, the threshold value being determined by an overflow transistor. When the threshold value is surpassed, the method provides transferring the overflown charges to a further capacitor. The method comprises providing a high gain readout from a first set of charges stored in the first capacitor, and at least one gain readout different from the high gain readout from a further set of charges including charges stored in at least a further capacitor. Switching means are used to provide readout of the different sets of charges, one of the sets being the charge in the first capacitor C1. The switching means allow providing readout of the first capacitor and providing merging of stored charges in at least a further capacitor.

Figure 8:
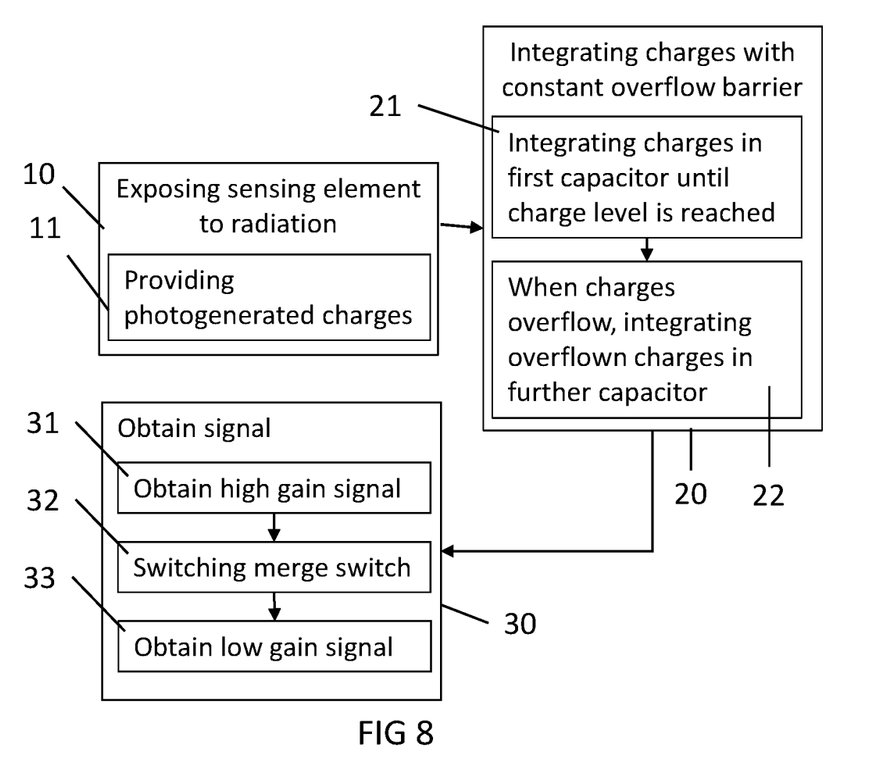
FIG. 8 is a flowchart with method steps for driving a pixel structure or pixel in accordance with embodiments of the present invention.

FIG. 8 is a flowchart illustrating steps and sub-steps in accordance with embodiments of the read-out method of the further aspect. The method comprises exposing 10 sensing elements to radiation, for providing 11 photogenerated charges. Then the charges are integrated 20 using a charge storage circuit in the pixel structure. In particular the charges are integrated 21 in a first capacitor C1 for a charge level under a predetermined charge set by an overflow transistor provided in the pixel structure. The overflow transistor is set with a constant bias DC signal continuously on the one or more overflow transistors (e.g. on the control electrode), for example before exposure. If the charge level surpasses the threshold set by the overflow transistor, overflown charges are integrated 22 in a further capacitor C2.

The method includes obtaining 30 a signal based on the photogenerated charges. This comprises the main steps of obtaining 31 a high gain level signal and obtaining 33 at least a further signal being a lower gain level signal. The readout is obtained from the first capacitor C1, and subsequently switching 32 a merge switch Sa for merging the charges of two capacitors.

The procedure may comprise resetting the charge storage circuit, e.g. by resetting charges at least in the capacitors.

The readout method is described hereinafter in more in detail, for the embodiment of the pixel illustrated in FIG. 1. Before the start of the exposure of the radiation sensing element 101, the reset switches can be activated (closed) to reset the charge on the capacitors. By closing the reset switches, both sides of the capacitors are connected to the same supply voltage VDD (V1=VDD, V2=VDD), hence any charge present on the capacitors is drained away. The reset switches are opened again, to prepare the capacitors for collecting charges. A potential barrier is formed by the overflow transistor M1 between the readout node 103 and the second capacitor C2, and a merge switch Sa between the second capacitor and the readout node 103 is open so the readout node 103 is only connected to the second capacitor C2 through the overflow transistor M1; however, the first capacitor C1 connects to the readout node 103 regardless what happens at the overflow transistor M1. The potential barrier may be generated by applying a DC signal (e.g. a constant voltage $V_{DC}$) to the control electrode of the overflow transistor M1. The overflow transistor M1 shows a threshold voltage $V_{th}$. Hence the potential barrier has a threshold value of $V_{DC}$–Vth. Exposure of the radiation sensing element 101 can start. Charges are generated 11 in the sensing element due to the radiation exposure, and an input current $I_{input}$ may start being integrated in C1, see FIG. 1. During this integration, the voltage V1 decreases gradually, the charge integrated "Q" on C1 obeys the relation:

$$Q \approx (VDD - V1) * C1$$

After some time during integration, V1 may drop below $V_{DC}$~$V_{th}$. From that point on, the charge starts being integrated on the second capacitor C2, and V1 will not drop further. From this point on V2 will decrease. The first capacitor C1 is smaller than C2. The first part of the charge is integrated on C1, and provides a "high gain" signal level. The second part is integrated on the larger C2 and allows providing a "low gain" signal level.

At the moment of actual readout, a signal is provided based on the voltage V1, which is proportional to the charge on C1, thus providing 31 the high gain signal level readout. For example, a readout stage connected to the node 103 can be configured to provide a signal based on the voltage V1. Then, the merge switch Sa can be pulsed or set high, so as to shunt the first and second capacitors C1, C2, and thus merge the charges collected in these capacitors C1 and C2 onto the output node 103, which is read out subsequently as the "low gain signal". These two signal levels can be combined, thus providing a method with HDR capabilities.

The method of the present invention may provide collecting charges in more than two capacitors, thus providing further levels V3 by providing a further overflow transistor M2 and a capacitor C3. The third capacitor C3 is configured to collect charges overflowing from the further overflow transistor M2 once the charges collected in the second capacitor C2 generate a voltage V2 low enough for the further overflow transistor M2 to become conductive.

Figure 9:
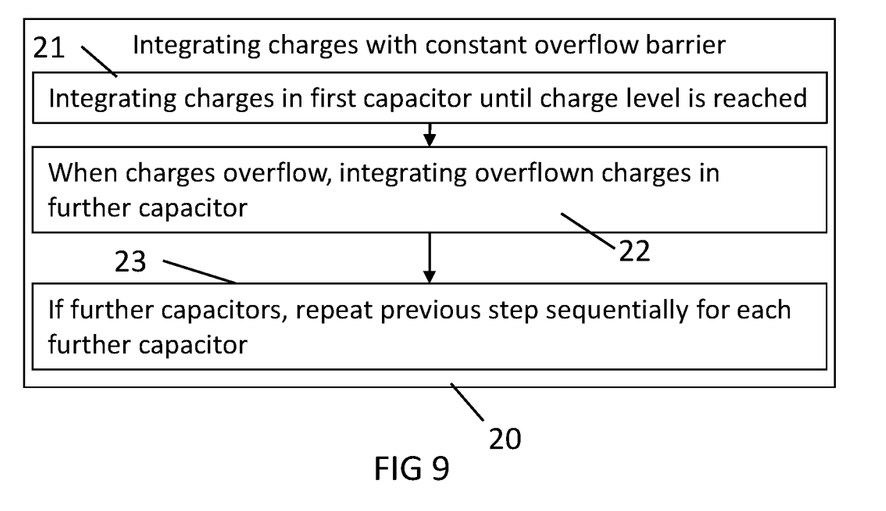
FIG. 9 is a detail of a specific step of the method in accordance with embodiments of the present invention.

FIG. 9 shows a detail of the step of integrating charges, showing that if there are more capacitors, this process can be repeated 23 as many times as capacitors are provided in the charge storage circuit. The node or nodes between the further gates and further capacitors are connectable to the readout via switching means for merging the charges at the readout node 103. This allows to provide one or more 'medium gain' signal readouts, by sequentially merging charges at the readout by activation of the merge switches in suitable order, sequentially merging charges of capacitors with increasingly larger capacitance. Thus, the readout signal is based on charges integrated in the first capacitor, subsequently based on charges integrated in the first capacitor and the at least one further capacitor.

Each overflow transistor in the pixel structure can be connected to a single DC signal. Providing the overflow transistors may comprise providing a constant DC signal via feedback loop 110 to the control electrodes of any or of each of the overflow transistors M0, M1, M2, for example a single feedback loop may be provided for any or for all of the overflow transistors. This advantageously improves the stability of the potential barrier.

In a further aspect of the present invention, a control unit 104 may be provided, which is configured to execute the steps of the method of the present invention. For example, the control unit 104, as shown in FIG. 2, may be configured for controlling the switching means (e.g. controlling any or all of the merge switches Sa, Sb), optionally providing control of the reset switches RST1, RST2, RST3, e.g. of each reset switch associated to a capacitor in the charge storage circuit.

The use of a single DC signal on the control electrodes of the overflow transistors advantageously provides stable full-well capacity conditions (and stable gain levels). The present invention also allows different gain level readouts using a pure logic voltage bias in the merge switches, Sa, Sb . . . (e.g. on the gates of transistors acting as merge switches). Thus, the merge switch(es) can be controlled between only two (on and off) states for providing merging of charges in capacitors, so the switching means of the present invention advantageously does not require accurate signals. A simple control unit 104 which uses coarse logic voltage bias can be used.

Depending on the actual circuit implementation, the merge and/or reset switch(es) may be transistors of a polarity which is opposite to the polarity of the transistors which provide the overflow transistor (PMOS vs NMOS).

The invention claimed is:

1. A pixel structure for reading charges generated by a radiation sensing element upon exposure thereof to radiation, comprising:
    a first capacitor configured for integrating charge from the radiation sensing element;
    at least one further capacitor configured for integrating charge from the radiation sensing element;
    a first overflow transistor having its control electrode connected to a static (DC) voltage, for setting a predetermined threshold level and configured to allow charges generated in the radiation sensing element to be integrated:
    in the first capacitor for a level of charge generated by the radiation sensing element when said level remains under a predetermined threshold level; or in the at least one further capacitor for a level of charge generated by the radiation sensing element when said level of charge surpasses said predetermined threshold level;

at least one merge switch for merging charges of the first capacitor with charges of the at least one further capacitor;

a further overflow transistor connected between the first overflow transistor and a connection to the radiation sensitive element, a signal output node for providing a readout signal based on integrated charges, wherein the signal output node is connectable to the at least one further capacitor via the at least one merge switch, and wherein the signal output node is connected to the first capacitor directly.

2. The pixel structure of claim 1, wherein the at least one merge switch is configured for shunting the first capacitor and a further capacitor, thereby allowing providing a readout based on charges integrated in the first capacitor and the further capacitor.

3. The pixel structure of claim 1, further comprising a buffer amplifier connected to the signal output node.

4. The pixel structure of claim 1, wherein the further overflow transistor comprises a control electrode arranged for being connected to the same static voltage (DC) as the first overflow transistor.

5. The pixel structure of claim 1, further comprising a feedback loop for biasing at least one overflow transistor.

6. The pixel structure of claim 5, wherein the feedback loop is configured for biasing all overflow transistors.

7. The pixel structure of claim 1, where the capacitance of each further capacitor is at least larger than the capacitance of the previous capacitor.

8. The pixel structure of claim 1, wherein the at least one further capacitor comprises a plurality of further capacitors each configured for receiving charges from the radiation sensing element via an associated overflow transistor, each associated overflow transistor optionally biased with a same bias voltage, being configured to allow charges generated in the radiation sensing element to be integrated in the associated further capacitors depending on a level of charge already being stored in the previous capacitor.

9. The pixel structure of claim 1, further comprising at least one reset transistor for resetting charges integrated in at least one of the first capacitor and at least one further capacitor.

10. A method of reading charges generated by a radiation sensing element, the method comprising:

providing photogenerated charges by exposing the radiation sensing element to radiation;

integrating the photogenerated charges in a first capacitor for a charge level under a first predetermined charge, and further integrating any further photogenerated charge in at least one further capacitor by overflowing charges over a first overflow transistor having its control electrode connected to a static DC voltage bias;

obtaining a high gain signal level representative of the charges integrated in the first capacitor while a first merge switch is switched off, and subsequently switching the merge switch on thereby obtaining a low gain signal level representative of the charges integrated in the first capacitor and in the at least further capacitor.

11. The method of claim 10, further comprising stabilizing a bias voltage over the radiation sensing element by a further overflow transistor connected to the radiation sensing element and biased with a constant voltage.

12. The method of claim 11, further comprising biasing the first overflow transistor and the further overflow transistor with a same constant voltage.

13. The method of claim 10, wherein integrating the photogenerated charges comprises integrating the photogenerated charges in the first capacitor for a charge level under the first predetermined charge, and further integrating further photogenerated charges in the plurality of further capacitors each further capacitor being connected to a previous capacitor by an overflow transistor.

14. The method of claim 13, wherein obtaining the low gain signal level comprises obtaining a signal level representative of the charges integrated in the first capacitor and in each of the further capacitors, and further comprising obtaining a medium gain signal level representative of the charges integrated in the first capacitor and in less than each of the further capacitors.

\* \* \* \* \*